Aug. 2, 1938.    F. G. HODSDON    2,125,344
BRACKET FOR RELEASER MILKER SYSTEMS
Filed April 6, 1937

Inventor
Floyd G. Hodsdon
By V. T. Lasagne
Atty.

Patented Aug. 2, 1938

2,125,344

UNITED STATES PATENT OFFICE 2,125,344

BRACKET FOR RELEASER MILKER SYSTEMS

Floyd G. Hodsdon, Milwaukee, Wis., assignor to International Harvester Company, a corporation of New Jersey Application April 6, 1937, Serial No. 135,247

14 Claims. (Cl. 31—58)

This invention relates to a bracket or frame construction for steadying a milk receiver pail and for supporting a plurality of teat cups thereon.

In releaser milker systems, it is common practice to hang the milk receiver pail on a scale suspended in the dairy barn adjacent the cow being milked. In this manner, the milk is weighed as it flows into the pail. It was found in numerous instances, that the pendant pail would swing to and fro and occasional noises would result therefrom caused by the metal-to-metal contact of related parts. Therefore, it was found desirable to provide means for preventing the swinging of the pail. At the same time, it was found that the means could be further utilized for supporting a plurality of teat cups. In this manner, the teat cups could be suspended between milkings and filled with a chemical sterilizer similar to a milker solution rack. All the teat cups are supported vertically and all in the same horizontal plane. By filling the milk receiver with sterilizer, this can be forced out in quantity enough to cover all the inside surfaces of the teat cups.

It is then, the principal object of this invention to provide a bracket structure for steadying a milk receiver pail.

Another important object is to provide in this bracket structure means for supporting a plurality of teat cups.

Another important object is to provide the bracket structure with noise preventing covering at the portions thereof that contact the milk receiver pail and any support to which said frame may be attached.

Still another object is to provide means for supporting the teat cups in a secondary frame constructed of a series of continuous loops shaped to conform to the shape of the teat cups.

Still another object is to construct the secondary frame of a series of interfitting members providing a continuous frame having a plurality of loops therein.

Still another object is to provide the secondary frame with protective covering material to prevent scratching or marring of the teat cups supported thereby.

Briefly, these and other important objects are achieved by providing a bracket structure adapted to support a secondary frame. The secondary frame comprises a plurality of looped members having opposite ends interfitting to form a contiguous frame. Each of the loops is shaped to conform to the intermediate portion of a teat cup. The enlarged upper portions of the teat cups rest on the upper side of the loops and are supported thereby.

A further understanding of the objects and desirable features of the invention may be had from the following description and shown in the accompanying sheet of drawings, in which.

Figure 1:
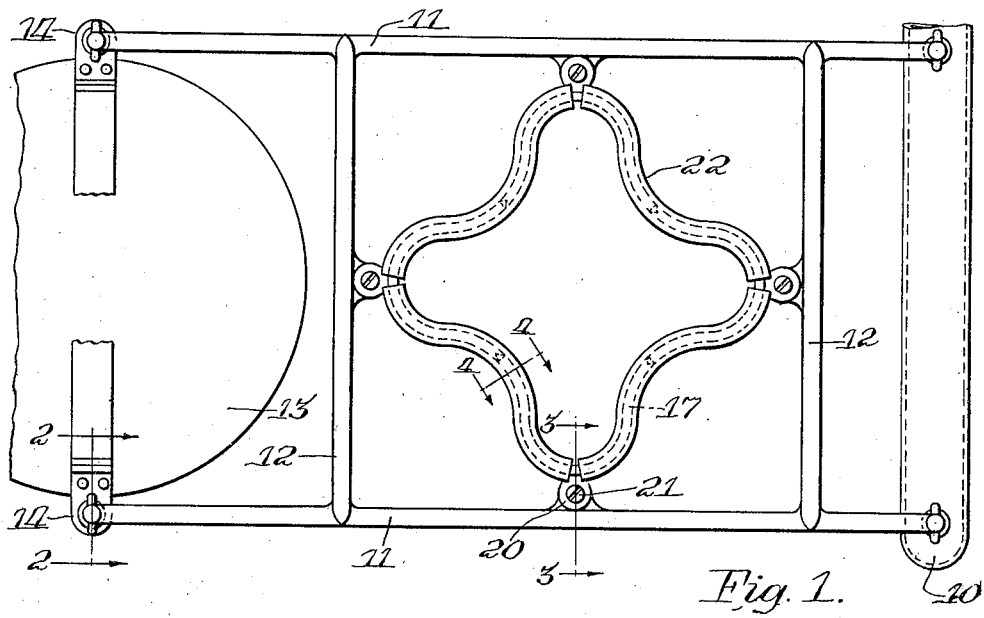
Figure 1 is a plan view showing a portion of a milk receiver pail steadied by the bracket structure forming the subject matter of the present invention; the secondary frame or teat cup supporting means is also shown in the figure.
Figure 2:
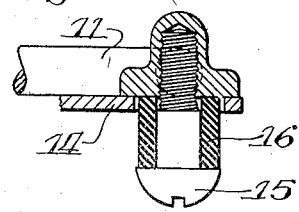
Figure 2 is an enlarged detailed sectional view taken on the line 2—2 of Figure 1, showing the connection between the frame structure and the milk receiver pail.
Figure 3:
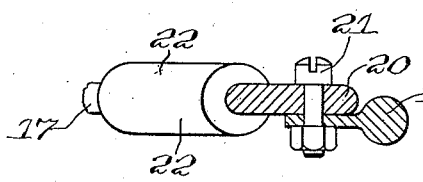
Figure 3 is an enlarged detailed sectional view taken on the line 3—3 of Figure 1, showing the connection between the secondary frame and the main bracket structure.
Figure 4:
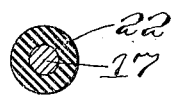
Figure 4 is an enlarged sectional view taken on the line 4—4 of Figure 1 showing the protective covering material over the teat cup supporting frame; and, Figure 5 is a detailed view of one of the loops of the secondary frame showing its opposite ends having means thereon adapted to interfit with an adjacent loop.

As shown in Figure 1, a stanchion pipe 10 is indicated as illustrative of a support to which the bracket structure may be attached for steadying the milk receiver pail. The bracket structure comprises a pair of longitudinal frame members 11 cross-connected by a pair of transverse frame members 12 welded or otherwise secured thereto. It will be understood, of course, that the bracket structure may be connected to any support. Each end of each longitudinal frame member 11 is provided with means for attaching the frame structure to the stanchion pipe 10 or any other support and to a milk receiver pail 13 having a pair of diametrically opposed apertured brackets or ears 14. Each of the means for attaching the bracket to the stanchion pipe or the milk receiver pail comprises, as best shown in Figure 2, a cap screw 15 threaded through a rubber bushing 16 and into an end of the bracket structure. Figure 2 illustrates the cap screw and rubber bushing secured to an end of the bracket structure as being connected to the ear 14 of the milk receiver pail 13.

It will be understood, of course, that the stanchion pipe ends of the bracket structure are similar to the pail ends of the bracket. By providing the cap screws 15 and rubber bushings 16, metal to metal contact is prevented between the bracket structure and the milk receiver pail and the stanchion pipe.

Thus far, it will be seen that a rigid bracket of frame structure has been provided. This bracket structure, as previously pointed out, is adapted to be connected between a milk receiver pail and a support, such as the stanchion pipe 10. The provision of the cap screws and the rubber bushings prevents any noise that may result from movement of the relative parts.

Figure 5:
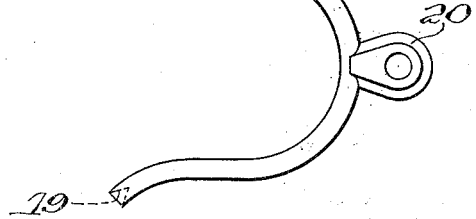

The secondary frame or teat cup supporting means is constructed of a series of loops 17, one of which is best shown in Figure 5. As shown, each loop is U-shaped and the ends of the legs are formed to interfit with the legs of an adjacent loop. One leg is provided with a conical end portion 18 and the other leg is provided with a complementary conical recess 19. Each loop is provided at its closed side with an apertured ear 20. As illustrated in the present embodiment of the invention, four loops 17 are positioned in the bracket structure 11 with opposite ends interfitting; that is, the conical portion 18 of one loop fits into the conical recess 19 of an adjacent loop, thus forming a secondary frame having a series of contiguous loops. The secondary frame is supported on the bracket structure by bolts 21, extending through the apertured ears 20 and secured to an ear on each of the frame members 11 and 12. In this manner, the secondary frame is rigidly supported by the bracket structure.

Protective covering material, preferably in the form of sections of rubber hose 22, covers the secondary frame. As best shown in Figure 1, each section of the rubber hose 22 covers substantially one-half of the adjacent loops 17. The rubber hose, as will be noted, thus overlies the junctions of adjacent loops and serves to aid in maintaining proper relation of the loops, as well as protecting the teat cups from damage.

In positioning the bracket structure between the stanchion pipe 10 and the milk receiver pail 13, one end of the bracket structure having the cap screws and the rubber bushings is connected to the stanchion pipe through openings provided therein. The other end, also having cap screws and rubber bushings, is connected to the apertured ears 14 on the milk receiver pail 13.

In as much as the longitudinal frame members 11 are rigidly cross-connected by the transverse frame members 12, the bracket structure forms a substantially rigid support between the stanchion pipe and the milk receiver pail 13, thus preventing movement of the milk receiver pail in any direction in a horizontal plane. The connections between the rubber bushings and the stanchion pipe 10 and the apertured ears 14 are loose to permit vertical movement of the milk receiver pail, as the milk therein is being weighed.

Between milking operations, the test cups may be supported in the secondary frame structure by merely placing a teat cup in each loop 15, thus providing a desirable support for the teat cups and eliminating the necessity of placing the teat cups in a milker solution rack. Thus it will be seen that a desirable means has been provided for steadying a milk receiver pail and for supporting a plurality of teat cups.

While only a preferred embodiment of the invention has been illustrated for the sake of disclosure, it will be apparent that numerous modifications and alterations thereof may be made without departing from the spirit and scope of the invention as indicated in the following claims.

What is claimed is:

1. In a bracket structure for steadying a pendant milk pail from a support, said pail having an apertured ear, a frame adapted to be connected at one end to the support, and means at the other end for engaging the apertured ear in the milk pail.

2. In a bracket structure for steadying a pendant milk pail from a support, said pail having a pair of apertured ears, a plurality of members interconnected to form a frame having opposite ends adapted to be connected to the support and to the pail.

3. In a bracket structure for steadying a milk pail in spaced relation to a support, said milk pail having a pair of apertured ears, and said support having a pair of spaced openings, a plurality of members interconnected to form a frame having means at opposite ends for engaging the apertured ears and the openings in the support.

4. In a frame structure for supporting teat cups, the combination of a plurality of members interconnected to form a frame, and a plurality of loop members interfitting to form a second frame carried by said first frame, and protective covering material sheathing said second frame, each of said loop members being adapted to support a teat cup.

5. In a frame structure for supporting teat cups, the combination of a plurality of members disposed in substantially the same plane and interconnected to form a frame, and a plurality of loop members interfitting to form a second frame carried by said first frame, each loop member being adapted to support a teat cup.

6. In a frame structure for supporting teat cups, the combination of a plurality of members disposed in substantially the same plane and interconnected to form a frame, and a U-shaped member carried by each member of the frame, a leg of each U-shaped member being adapted to interfit with a leg of an adjacent U-shaped member, each U-shaped member being provided with protective covering material and adapted to support a teat cup.

7. In a frame structure for supporting teat cups, the combination of a plurality of members interconnected to form a frame, and a second frame carried thereby for supporting a plurality of teat cups, said second frame being shaped to provide a series of contiguous loops, each adapted to support a teat cup.

8. In a bracket structure for steadying a pendant milk receiver pail and for supporting a plurality of teat cups, a support, the combination with the support of a pair of substantially parallel members adapted to be connected to the support at one end and to a milk pail at the other, and a frame including a plurality of contiguous loops carried by said substantially parallel members for supporting a plurality of teat cups.

9. In a bracket structure for steadying a pendant milk receiver pail and for supporting a plurality of teat cups, a support, the combination with said support of a pair of substantially parallel members adapted to be connected to the support at one end and to a milk pail at the other, a pair of cross members associated with the parallel members, and a frame carried by the parallel members and the cross members for supporting a plurality of teat cups, said frame being shaped to form a series of contiguous loops, each loop being adapted to support a teat cup.

10. In a bracket structure for steadying a pendant milk receiver pail and for supporting a plurality of teat cups, a support, the combination with the support of a plurality of members adapted to be connected to the support and to the milk pail, a frame carried by said members for supporting a plurality of teat cups, said frame being shaped to provide a series of contiguous loops, each loop being adapted to support a teat cup, and a protective covering material sheathing the frame.

11. In a bracket structure for steadying a pendant receiver pail and for supporting a plurality of teat cups, a support, the combination with the support of a plurality of members interconnected to form a frame, said frame being connected to the support and to the pail, and a second frame carried by said first frame and including a series of contiguous loops, each loop being adapted to support a teat cup.

12. In a bracket structure for steadying a pendant receiver pail and for supporting a plurality of teat cups, a support, the combination with the support of a pair of spaced longitudinal members connected at one end to the support and at the other end to the pail, a pair of spaced transverse members carried by the longitudinal members and maintaining the spaced relation thereof, a frame carried by said members including a series of loops having adjacent legs interfitting to form a continuous frame, each loop being adapted to support a teat cup, and protective covering material sheathing the frame.

13. In a bracket structure for steadying a pendant milk receiver pail and for supporting a plurality of teat cups, a support, the combination with the support of a plurality of members adapted to be connected to the support and to the milk pail, a frame carried by said spaced members for supporting a plurality of teat cups, said frame being shaped to provide a series of contiguous loops, each loop being adapted to support a teat cup.

14. In a bracket structure for steadying a pendant milk receiver pail and for supporting a plurality of teat cups, a support, the combination with the support of a plurality of members adapted to be yieldably connected to the support and to the milk pail, a frame carried by said spaced members for supporting a plurality of teat cups, said frame being shaped to provide a series of contiguous loops, each loop being adapted to support a teat cup, and a protective covering material sheathing the frame.

FLOYD G. HODSDON.